(12) United States Patent
Gerhardson et al.

(10) Patent No.: US 10,781,141 B2
(45) Date of Patent: Sep. 22, 2020

(54) COMPOSITION FOR A NOVEL GRADE FOR CUTTING TOOLS (71) Applicant: HYPERION MATERIALS & TECHNOLOGIES (SWEDEN) AB, Stockholm (SE)

(72) Inventors: Ylva Gerhardson, Uppsala (SE); Susanne Norgren, Huddinge (SE); Alistair Grearson, Coventry (GB)

(73) Assignee: HYPERION MATERIALS AND TECHNOLOGIES (SWEDEN) AB, Stockholm (SE)

( * ) Notice: Subject to any disclaimer, the term of this patent is extended or adjusted under 35 U.S.C. 154(b) by 410 days.

(21) Appl. No.: 15/105,004

(22) PCT Filed: Dec. 17, 2014

(86) PCT No.: PCT/IB2014/002828
§ 371 (c)(1),
(2) Date: Jun. 16, 2016

(87) PCT Pub. No.: WO2015/092528
PCT Pub. Date: Jun. 25, 2015

(65) Prior Publication Data
US 2016/0318811 A1 Nov. 3, 2016

Related U.S. Application Data

(60) Provisional application No. 61/916,878, filed on Dec. 17, 2013.

(51) Int. Cl.
*C22C 29/00* (2006.01)
*C22C 29/08* (2006.01)
(Continued)

(52) U.S. Cl.
CPC ...... *C04B 35/5626* (2013.01); *C04B 35/6261* (2013.01); *C04B 35/645* (2013.01);
(Continued)

(58) Field of Classification Search
CPC ......... C22C 1/051; C22C 1/053; C22C 1/055; C22C 1/056; C22C 1/058; C22C 19/07;
(Continued)

(56) References Cited

U.S. PATENT DOCUMENTS 6,293,986 B1 * 9/2001 Rodiger .................... B22F 3/23
419/14
6,413,293 B1 * 7/2002 Grearson ................ C22C 29/08
75/240
(Continued)

FOREIGN PATENT DOCUMENTS

| CN | 1116248 A | 2/1996 |
|---|---|---|
| JP | S6176646 A | 4/1986 |
| JP | H07216492 A | 8/1995 |
| JP | 2003155538 A | 5/2003 |
| JP | 200476049 A | 3/2004 |
| WO | 96/20057 A1 | 7/1996 |
| WO | 2005033348 A2 | 4/2005 |
| WO | 2012098102 A1 | 7/2012 |

OTHER PUBLICATIONS

"Glossary of Metallurgical and Metalworking Terms," Metals Handbook, ASM Handbooks Online, ASM International, 2002, pp. 1, 36, 120, 257. (Year: 2002).*

*Primary Examiner* — Vanessa T. Luk (57) ABSTRACT

A hard metal composition of material comprised of, in weight percent, an alloy of from 6-15% of cobalt content; a molybdenum content of from 5-15% of the cobalt content and a chromium carbide content of from 0-15% of the cobalt content and the balance of tungsten carbide.

5 Claims, 12 Drawing Sheets

(51) Int. Cl.
*C04B 35/56* (2006.01)
*C22C 1/05* (2006.01)
*C04B 35/626* (2006.01)
*C04B 35/645* (2006.01)

(52) U.S. Cl.
CPC ............ *C22C 1/051* (2013.01); *C22C 29/005* (2013.01); *C22C 29/08* (2013.01); *C04B 2235/3839* (2013.01); *C04B 2235/3847* (2013.01); *C04B 2235/404* (2013.01); *C04B 2235/405* (2013.01); *C04B 2235/785* (2013.01)

(58) Field of Classification Search
CPC ... C22C 29/005; C22C 29/08; C04B 35/5626; C04B 2235/3847; C04B 2235/785; C04B 2235/786; C04B 2235/405
See application file for complete search history.

(56) References Cited

U.S. PATENT DOCUMENTS

| | | | |
|---|---|---|---|
| 7,490,502 B2* | 2/2009 | Pauty | B21D 37/01 140/105 |
| 2002/0114981 A1* | 8/2002 | Andersson | C22C 29/08 428/698 |
| 2005/0072269 A1* | 4/2005 | Banerjee | C22C 29/08 75/240 |

* cited by examiner

COMPOSITION FOR A NOVEL GRADE FOR CUTTING TOOLS

RELATED APPLICATION DATA

This application is a § 371 National Stage Application of PCT International Application No. PCT/IB2014/002828 filed Dec. 17, 2014 claiming priority of U.S. Provisional Application No. 61/916,878, filed Dec. 17, 2013.

TECHNICAL FIELD

A hard metal composition of material comprised of, in weight percent, an alloy having a content of from 6-15% of cobalt; a molybdenum content of from 5-15% of the cobalt content and a chromium carbide content of from 0-15% of the cobalt content and the balance of tungsten carbide.

SUMMARY

In an embodiment, a hard metal composition of material is comprised of, in weight percent, an alloy having a content of from 6-15% of cobalt; a molybdenum content of from 5-15% of the cobalt content and a chromium carbide content of from 0-15% of the cobalt content and the balance of tungsten carbide.

The hard metal composition has a hard phase composed of one or more carbides, nitrides or carbonitrides selected from the group of tungsten, titanium, chromium, vanadium, tantalum, niobium, molybdenum or an equivalent material, or a combination thereof, bonded by a binder phase.

The hard metal composition has a binder phase is selected from the group of cobalt, nickel, iron, molybdenum and combinations thereof.

In an embodiment, the hard metal composition has a chromium content of from 5% to 15% of the cobalt content.

In an embodiment, the molybdenum is 15% and the chromium carbide is 15% of the cobalt content.

In an embodiment, the material has an increased hardness and a limited decrease in toughness.

In an embodiment, the material has a toughness to hardness ratio increase of at least 5%.

In an embodiment, a cutting tool of a hard metal composition of material is comprised of, in weight percent, an alloy of from 6-15% of cobalt; a molybdenum content of from 5-15% of the cobalt content and a chromium carbide content of from 0-15% of the cobalt content and the balance of tungsten carbide.

In an embodiment, a method of producing a hard metal composition of material comprises the steps of providing an alloy having a content of from 6-15 wt % of cobalt; providing of from 5% to of 15% of the cobalt content of molybdenum; providing of from 0% to of 15% of the cobalt content of chromium carbide; providing the balance of tungsten carbide; milling the molybdenum, chromium carbide, tungsten carbide and cobalt into a powder mixture; and sintering the powder mixture under pressure.

The foregoing summary, as well as the following detailed description of the embodiments, will be better understood when read in conjunction with the appended drawings. It should be understood that the embodiments depicted are not limited to the precise arrangements and instrumentalities shown.

DETAILED DESCRIPTION

A hard composition of material, such as cemented carbide, is appropriate as a substrate for metal cutting applications as it offers a unique combination of strength, hardness and toughness. As referred to herein a hard metal composition refers to a composite material normally having a hard phase composed of one or more carbides, nitrides or carbonitrides of tungsten, titanium, chromium, vanadium, tantalum, niobium, molybdenum or an equivalent material, or a combination thereof, bonded by a binder or metallic phase typically cobalt, nickel, iron, molybdenum or combinations thereof in varying proportions. The hardness of cemented carbide depends upon the concentration and contiguity of the hard phase. For example, the higher the concentration of tungsten carbide the greater the hardness.

Cemented carbide grades can be classified according to the binder phase content and WC grain size. Different types of grades have been defined as fine, medium, medium course and coarse. As referred to herein, a fine grade can be defined as a material with a binder content of from 3% to 20% and a grain size of less than about 1 μm, with nano, ultrafine and submicron fine grades having grain sizes of less than 0.1 μm, from 0.1 to 0.5 μm and from 0.5 to 1 μm, respectively.

The hard composition of material can be manufactured as ready to press (RTP) powder for pressing and sintering into components. The material can have tungsten carbide (WC) as the hard phase and cobalt (Co) as the binder phase. Molybdenum has been found to have good solubility in the cobalt binder of cemented carbide. Molybdenum has also been used for many years in cermet materials to increase toughness. The stacking fault energy for molybdenum is low, as for cobalt, which could possibly increase its creep resistance at higher temperatures.

According to one aspect, molybdenum (Mo) and chromium carbide ($Cr_3C_2$) are added as inhibitors and for alloying of the binder phase. The grain growth inhibiting properties of molybdenum, although not as strong as chromium, can be added in significant amounts along with chromium to WC—Co alloys.

The present disclosure relates to fine grained cement carbide having tungsten carbide (WC) as the hard phase and cobalt (Co) as the binder phase, having from 6-15 wt % Co content, a Mo content of from 5-15% of the Co content and a $Cr_3C_2$ content of from 0-15% of the Co content.

An advantage of this composition is that grain growth of the WC is inhibited without reducing the strength of the binder and thereby reducing edge chipping at metal cutting operations.

Example 1

Experimentation was performed evaluating the properties of Mo content of from 0.5 to 1.5 wt % combined with a $Cr_3C_2$ content of from 0.5 to 1.5% in a fine grained cemented carbide containing 10 wt % Co. Some of the variants show promising fracture toughness to hardness ratio, although the values are within the spread of the measurement methods.

An aim of the experimentation was to examine how Mo, along with Cr, would affect the properties of fine grained cemented carbides. For this purpose, a screening test of different Mo and Cr contents in a submicron WC alloy composition containing 10 wt % Co was set up. Samples were randomized in order to minimize effect of subjective human errors.

The materials were made in 100 g lots by lab milling WC, Co, Mo, $Cr_3C_2$ and PEG in ethanol for 8 hours. The materials where sintered at 1410° C. by sinter/HIP at 50 bar. The samples were polished, etched and Hc, Corn, density, HV30 and K1c properties measured. Because of the sensitivity of K1c measurements, all samples were re-measured after extra polishing.

A full X-Ray fluorescence (XRF) analysis of the Cr, Mo and Co content of all samples was made in order to confirm the actual composition and give a precise evaluation of the results. SEM photographs of some of the microstructures are shown in FIGS. 1-7. Metallographic results from test variants are shown in Table 1, where samples 1, 7 and 8 are all repeats of the same composition.

In samples 3 and 10, a third phase precipitation was apparent in the microstructure. Carbon analysis of sintered samples 1, 2, 3, 10 and 11 showed that the carbon content in these samples was comparable to the recipes calculated, as shown in Table 2. For samples 3 and 10, it can be supposed that the precipitation was not caused by a lack of carbon.

TABLE 2

|  | 1 | 3 | 10 | 5 |
|---|---|---|---|---|
| Total carbon (%) | 5.46 | 5.51 | 5.50 | 5.45 |
| Recipe total carbon (%) | 5.50 | 5.59 | 5.52 | 5.55 |

Figure 8:
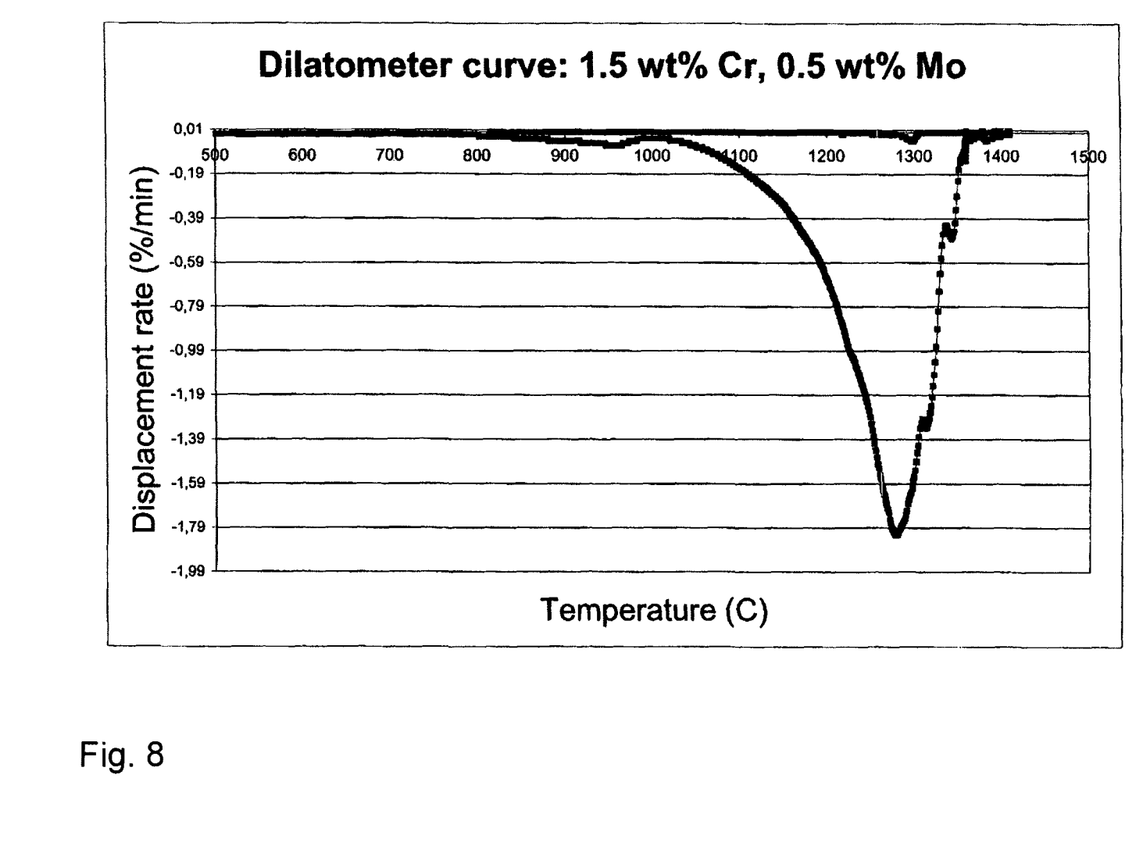
FIG. 8 is a thermomechanical analysis (TMA) curve showing the shrinkage rate difference between samples having high Cr content.
Figure 9:
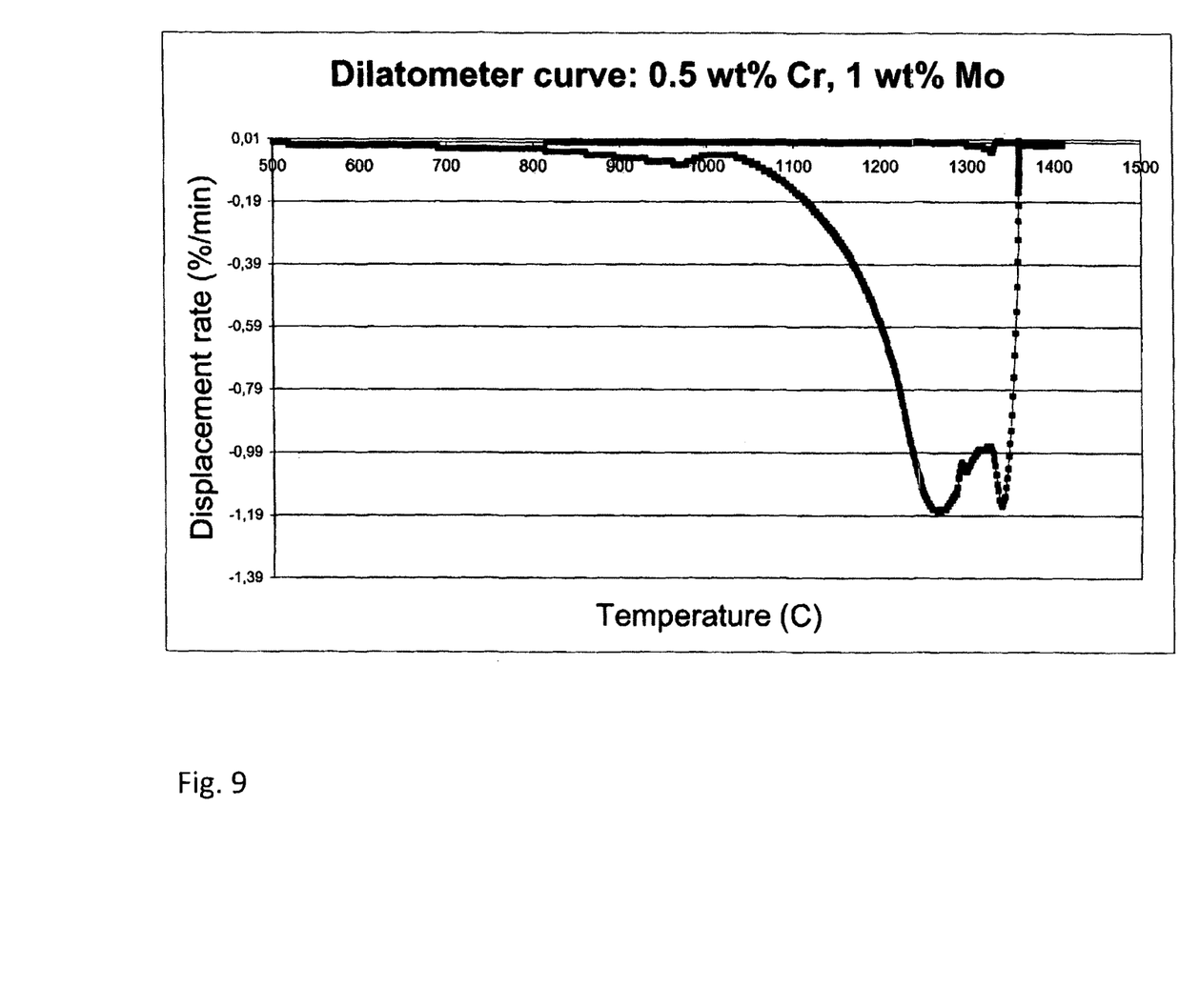
FIG. 9 is a thermomechanical analysis (TMA) curve showing the shrinkage rate difference between samples having lower Cr content.

Referring to FIGS. 8 and 9, thermomechanical Analysis (TMA) curves show shrinkage rate difference between samples having high Cr content and low Cr content. As shown in FIG. 8, at a high Cr content (1-1.5 wt %) the displacement curve is very sharp and fast, with a maximum rate at approximately 1280° C. As shown in FIG. 9, for a low Cr content sample (0.5 wt %) the displacement curve has two separate peaks, one at approximately 1250° C. and one at approximately 1330° C., which suggests that the Mo content is affecting the shrinkage in a more pronounced way and that the melting is of a more sluggish nature.

Figure 10:
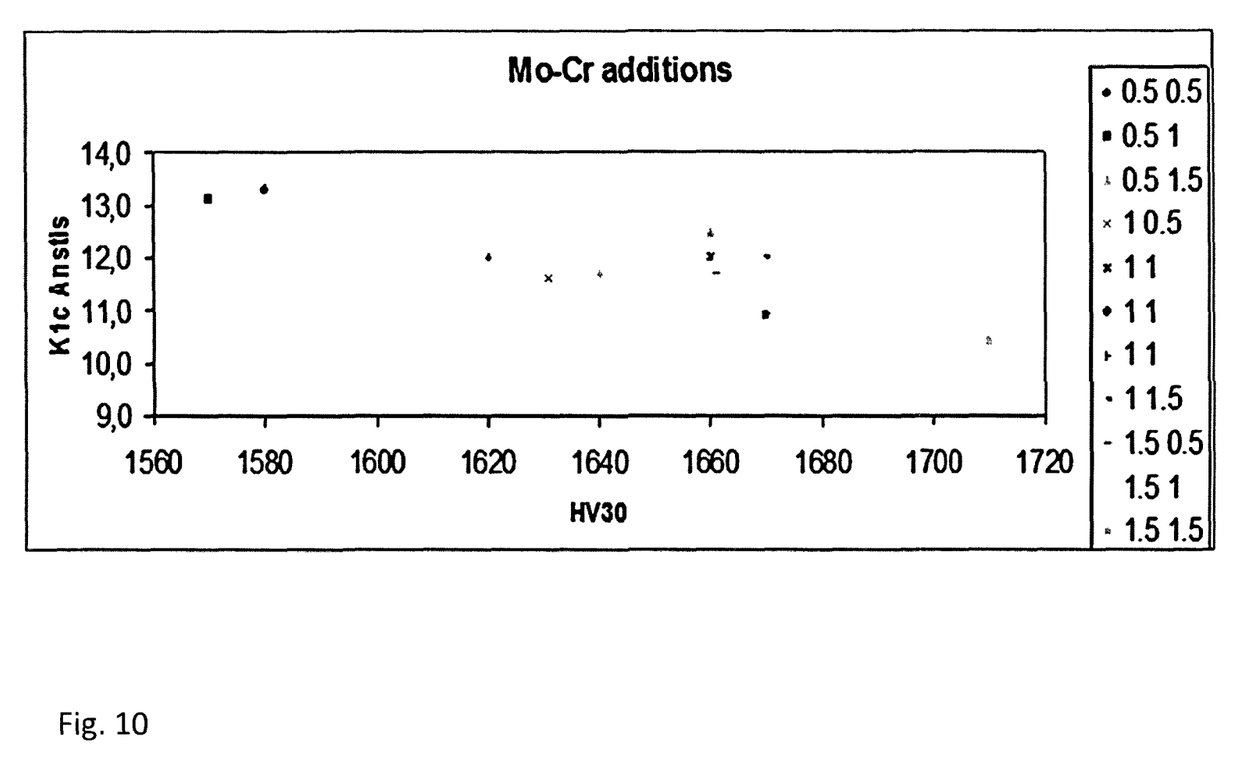
FIG. 10 is a graph illustrating the relationship between hardness and toughness of the tests variants.
Figure 11:
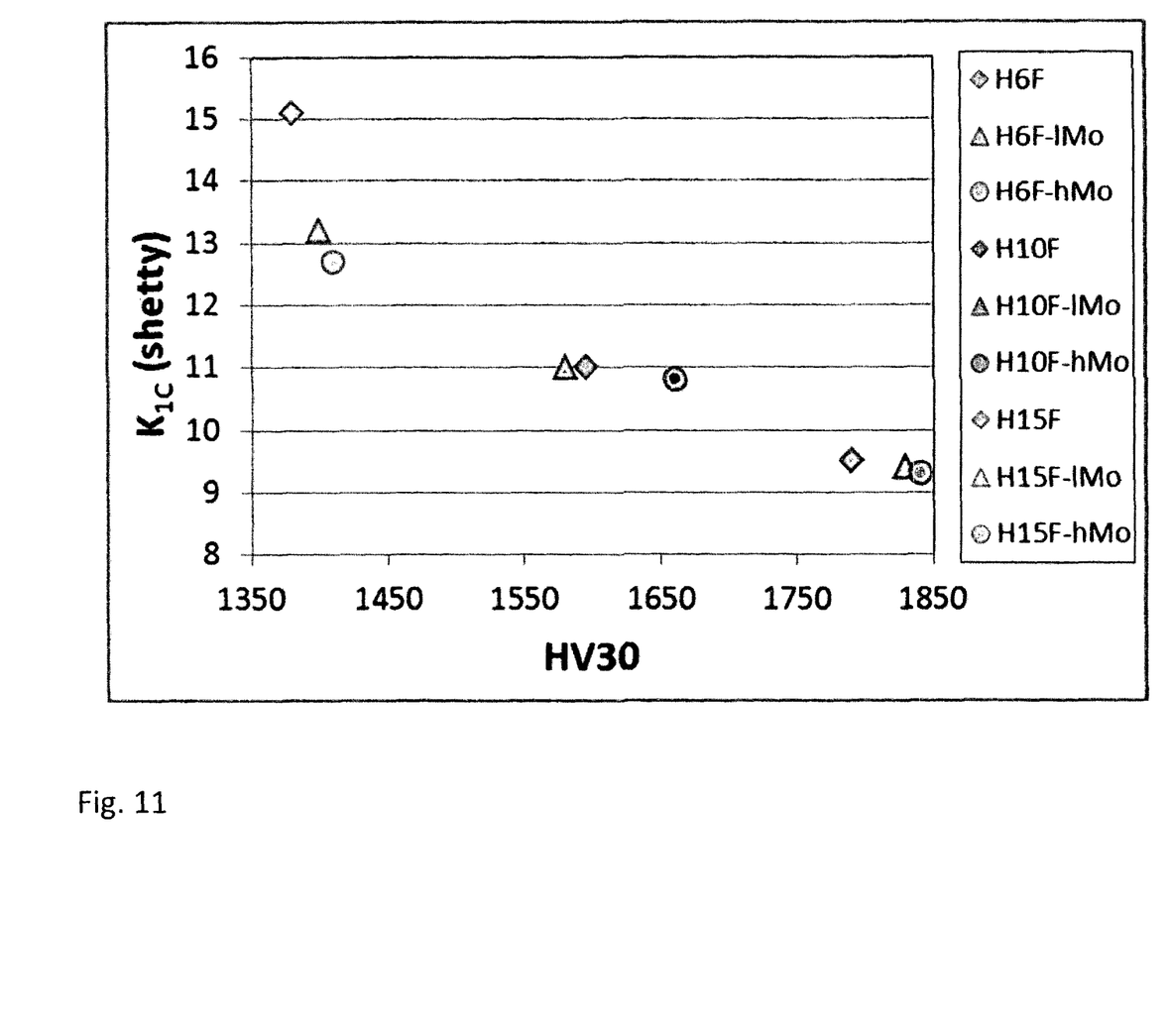
FIG. 11 is a graph illustrating the relationship between hardness and toughness of the tests variants.

The relationship between hardness and toughness of the tests variants is shown graphically in FIGS. 10 and 11. The K1c and HV30 of different compositions are shown with the $Cr_3C_2$ content labeled as the first value and the Mo content as the second value in the table. Three outlier points with elevated K1c values were observed for some of the compositions with higher Mo additions and having the same hardness.

The hardness to toughness ratio can be determined as follows:

$$=(K1cH-K1cL)/K1cL$$

where

K1cH is the average K1c of a sample having a higher Mo content

K1cL is the average K1c of a sample having a lower Mo content.

TABLE 3

| Sample no | $Cr_3C_2$ | Mo | HV30 | K1c Anstis | K1c Shetty | Avg K1c |
|---|---|---|---|---|---|---|
| 1 | 1 | 1 | 1620 | 12.0 | 10.8 | 11.4 |
| 2 | 0.5 | 1 | 1570 | 13.1 | 10.8 | 11.95 |
| 3 | 1.5 | 0.5 | 1661 | 11.7 | 10.4 | 11.05 |
| 4 | 1.5 | 1.5 | 1710 | 10.4 | 9.8 | 10.1 |
| 5 | 0.5 | 0.5 | 1580 | 13.3 | 11.0 | 12.15 |
| 6 | 1 | 1.5 | 1670 | 12.0 | 10.6 | 11.3 |

TABLE 1

Figure 1:
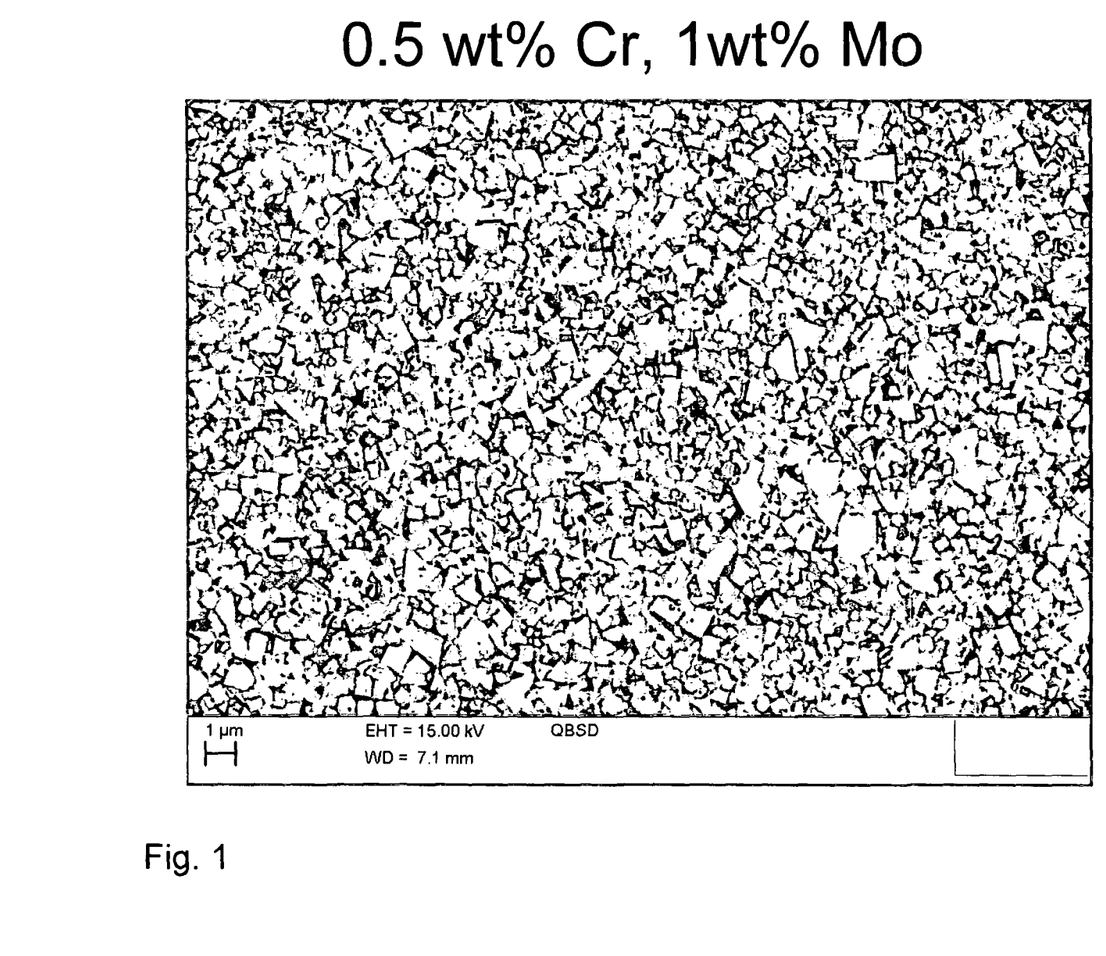
FIG. 1 is an electron microscope image of a 1.0 wt % Mo, 0.5 wt % $Cr_3C_2$ in 10 wt % Co fine grained cemented carbide material.
Figure 2:
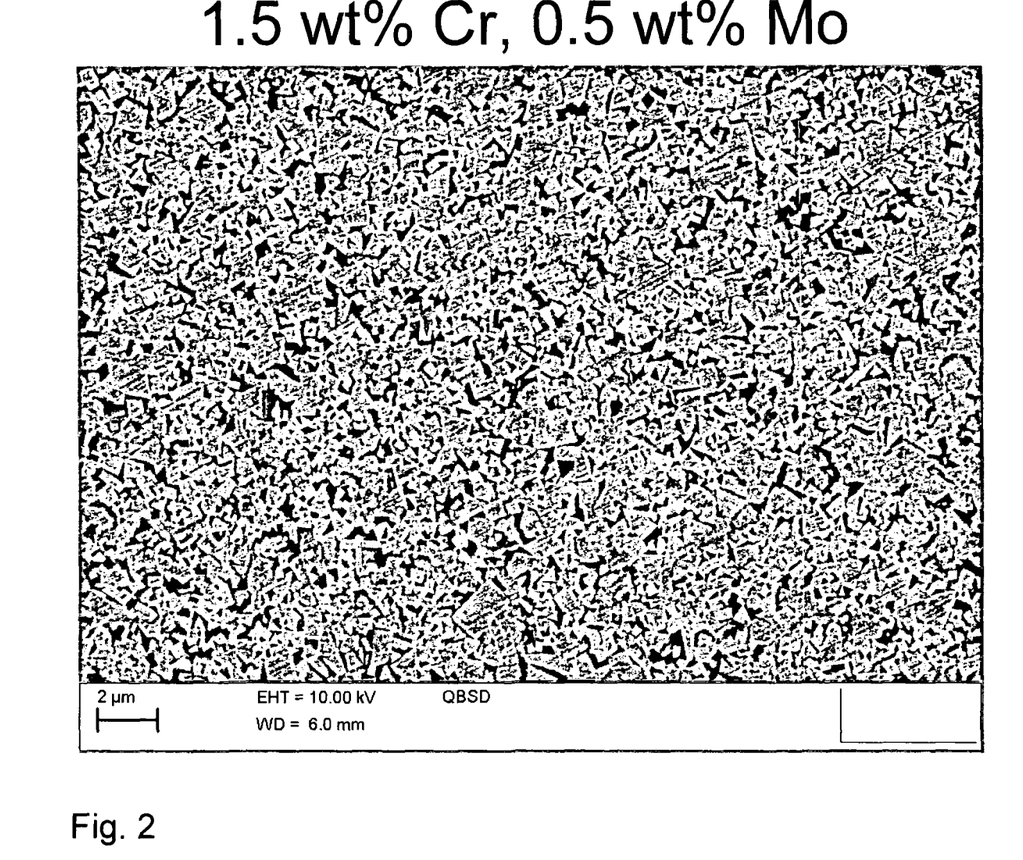
FIG. 2 is an electron microscope image of a 0.5 wt % Mo, 1.5 wt % $Cr_3C_2$ in 10 wt % Co fine grained cemented carbide material
Figure 3:
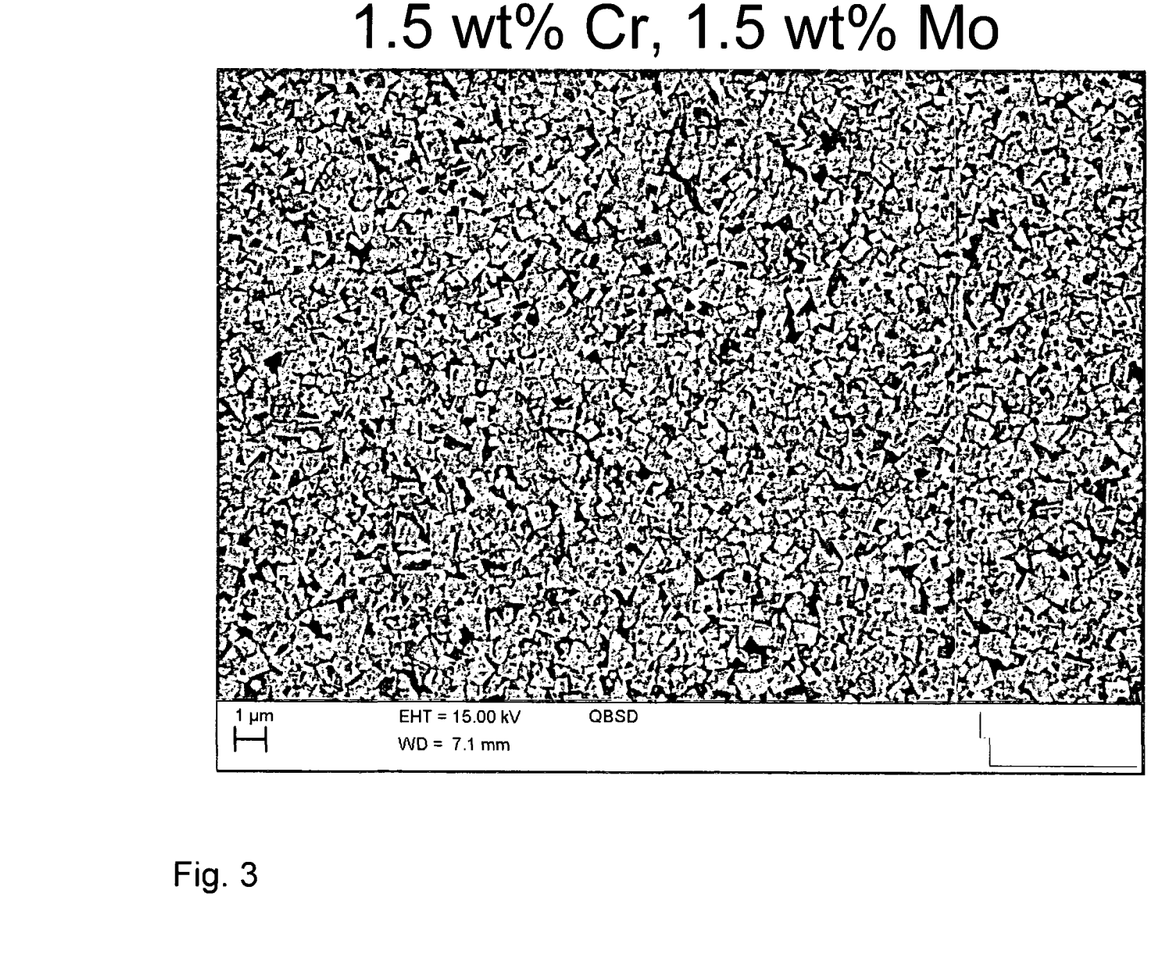
FIG. 3 is an electron microscope image of a 1.5 wt % Mo, 1.5 wt % $Cr_3C_2$ in 10 wt % Co fine grained cemented carbide material.
Figure 4:
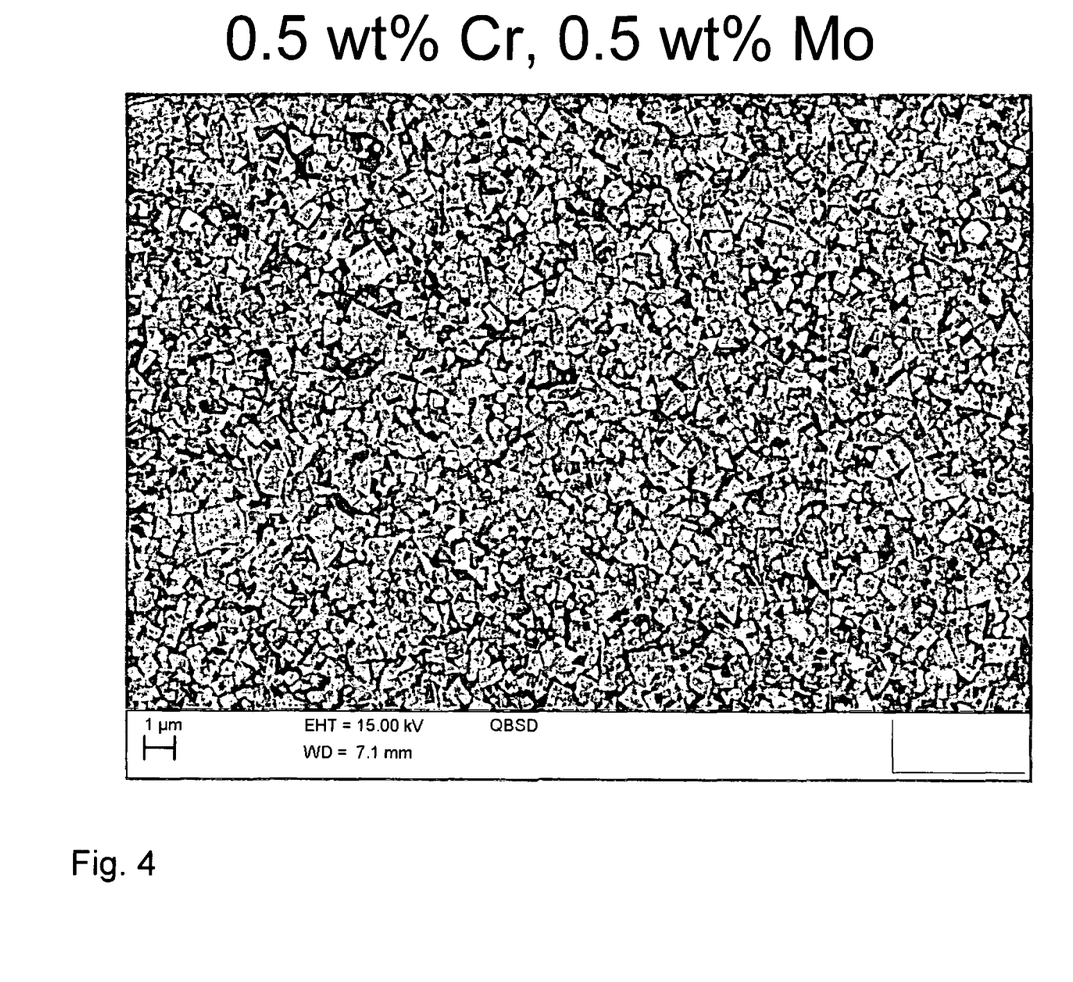
FIG. 4 is an electron microscope image of a 0.5 wt % Mo, 0.5 wt % $Cr_3C_2$ in 10 wt % Co fine grained cemented carbide material.
Figure 5:
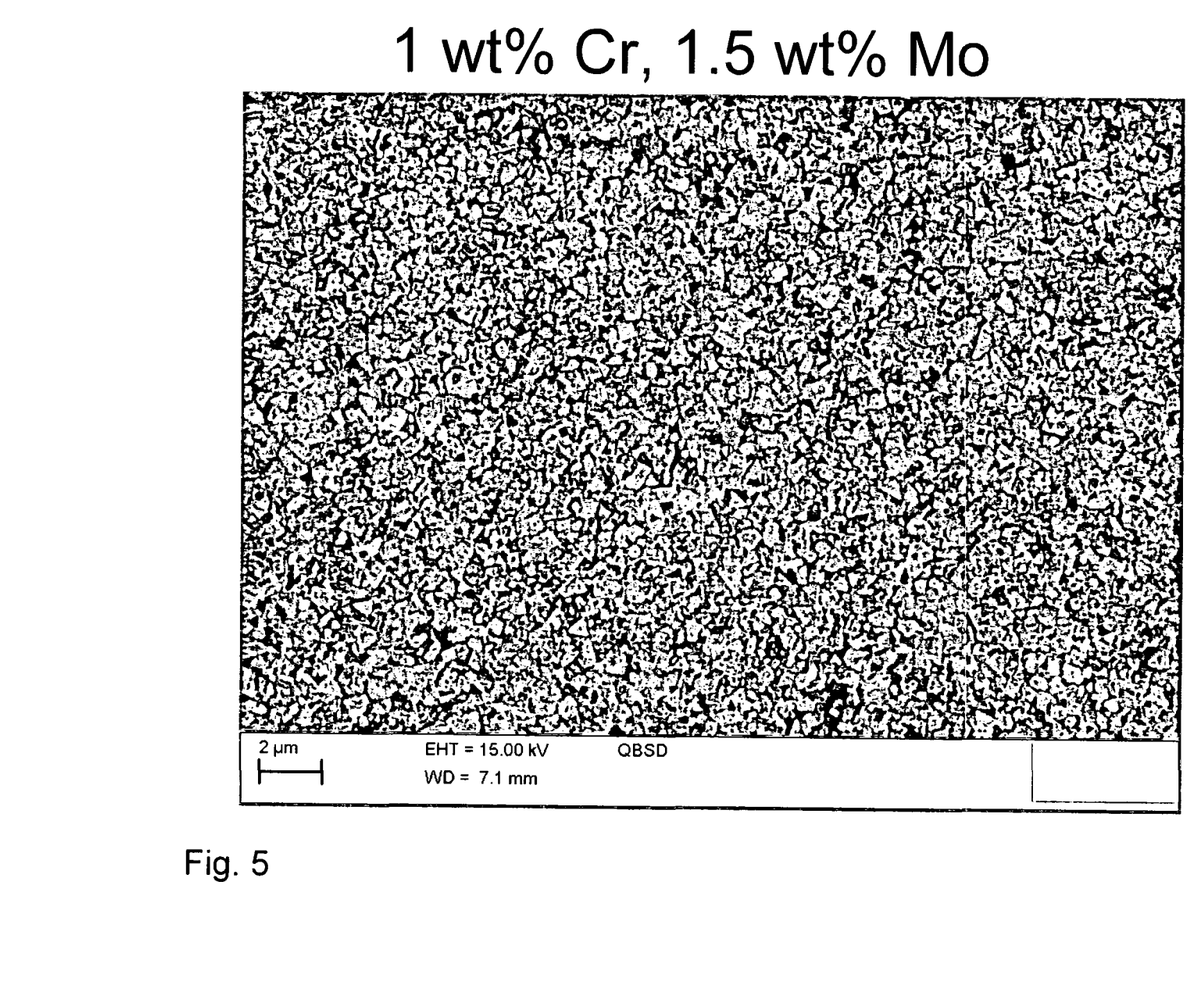
FIG. 5 is an electron microscope image of a 1.5 wt % Mo, 1.0 wt % $Cr_3C_2$ in 10 wt % Co fine grained cemented carbide material.
Figure 6:
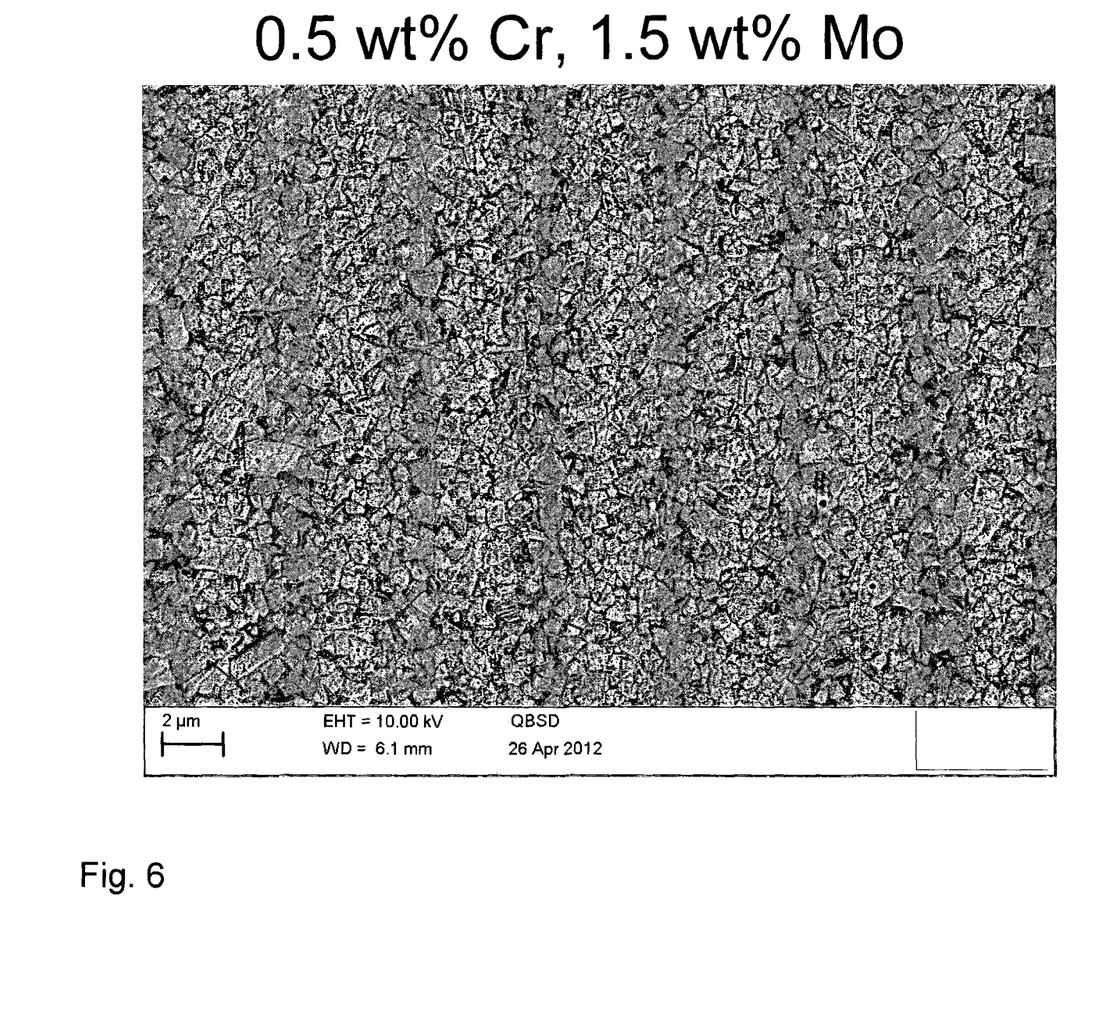
FIG. 6 is an electron microscope image of a 1.5 wt % Mo, 0.5 wt % $Cr_3C_2$ in 10 wt % Co fine grained cemented carbide material.
Figure 7:
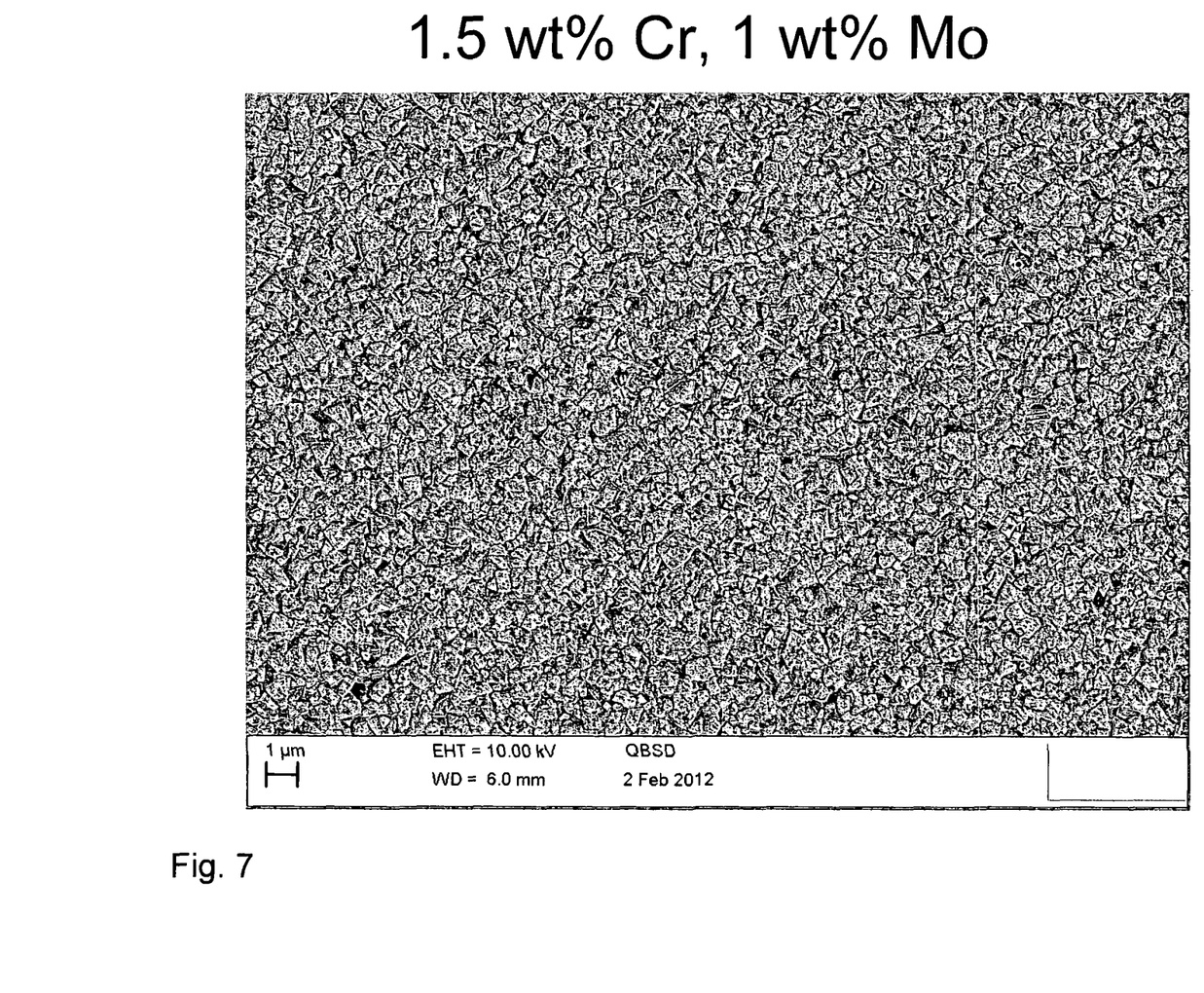
FIG. 7 is an electron microscope image of a 1.0 wt % Mo, 1.5 wt % $Cr_3C_2$ in 10 wt % Co fine grained cemented carbide material.

| Sample no | $Cr_3C_2$ | Mo | HV30 | K1c Anstis | K1c Shetty | Hc | Com | Density |  |
|---|---|---|---|---|---|---|---|---|---|
| 1 | 1 | 1 | 1620 | 12.0 | 10.8 | 21.4 | 6.1 | 14.29 |  |
| 10 | 0.5 | 1.5 | 1660 | 12.5 | 10.8 | 22.7 | 6.3 | 14.25 | FIG. 6 |
| 11 | 1.5 | 1 | 1640 | 11.7 | 10.3 | 22.5 | 6.3 | 14.22 | FIG. 7 |
| 2 | 0.5 | 1 | 1570 | 13.1 | 10.8 | 20.1 | 7.5 | 14.35 | FIG. 1 |
| 3 | 1.5 | 0.5 | 1661 | 11.7 | 10.4 | 20.9 | 6.6 | 14.21 | FIG. 2 |
| 4 | 1.5 | 1.5 | 1710 | 10.4 | 9.8 | 26.0 | 5.3 | 14.22 | FIG. 3 |
| 5 | 0.5 | 0.5 | 1580 | 13.3 | 11.0 | 20.7 | 7.0 | 14.34 | FIG. 4 |
| 6 | 1 | 1.5 | 1670 | 12.0 | 10.6 | 23.5 | 6.0 | 14.23 | FIG. 5 |
| 7 | 1 | 1 | 1660 | 12.0 | 10.5 | 22.7 | 6.1 | 14.31 |  |
| 8 | 1 | 1 | 1670 | 10.9 | 9.9 | 24.4 | 5.8 | 14.10 |  |
| 9 | 1 | 0.5 | 1631 | 11.6 | 10.2 | 21.3 | 6.7 | 14.32 |  |

TABLE 3-continued

| Sample no | Cr₃C₂ | Mo | HV30 | K1c Anstis | K1c Shetty | Avg K1c |
|---|---|---|---|---|---|---|
| 7 | 1 | 1 | 1660 | 12.0 | 10.5 | 11.25 |
| 8 | 1 | 1 | 1670 | 10.9 | 9.9 | 10.4 |
| 9 | 1 | 0.5 | 1631 | 11.6 | 10.2 | 10.9 |
| 10 | 0.5 | 1.5 | 1660 | 12.5 | 10.8 | 11.65 |
| 11 | 1.5 | 1 | 1640 | 11.7 | 10.3 | 11 |

Referring to Table 3, in samples 3 and 10 there is a 5.4% increase in toughness. With samples 6 and 8 the percentage differences rises to 8.7%. Accordingly, at least a 5% increase in toughness to hardness ratio is achieved.

Figure 12A:
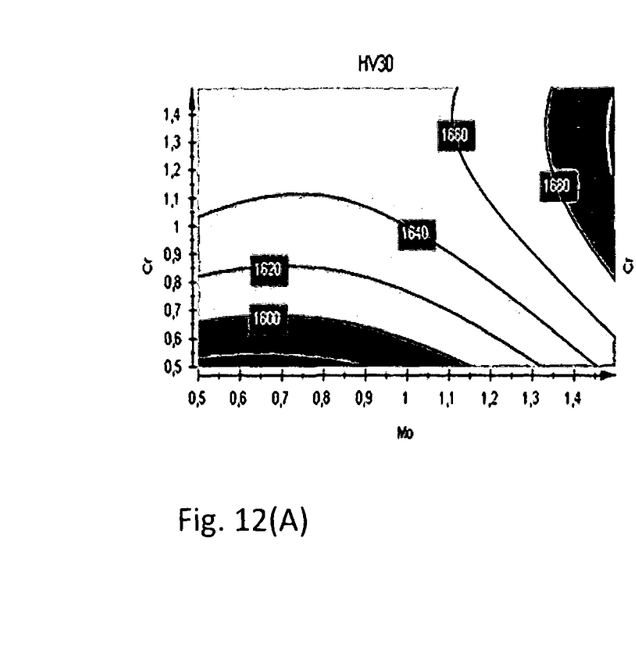
FIGS. 12(a) and 12(b) are plots representing the Mo additions versus responses in hardness and Shetty fracture toughness.
Figure 12B:
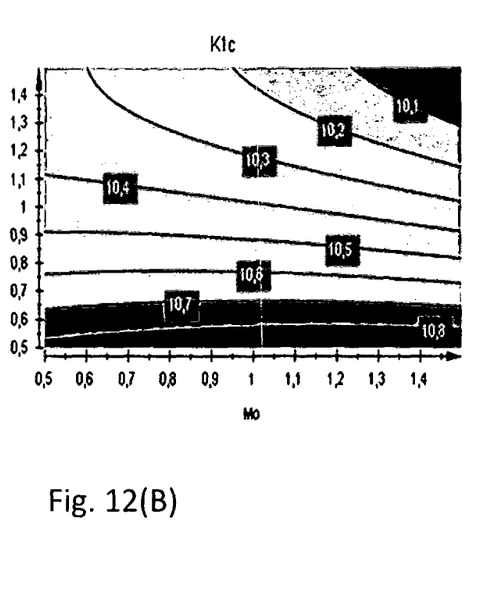

A plot using MODDE® software (Umetrics, Umea, SE), representing the Mo additions versus responses in hardness and Shetty fracture toughness are shown in FIGS. 12(A) and 12(B). The result indicates that a large amount of Mo, i.e., up to 1.5 wt %, can be added without significant decrease in toughness. This can be seen as the iso-toughness lines are flat as the Mo content is increased.

The above shows that a relatively high amount of Mo can be dissolved into Co. The inhibition effect also seems small based on the Hc values achieved. It should be appreciated that comparison of the variants is subject to the slight differences in their binder volumes.

Example 2

Experimentation was performed with a variant containing of 1.5 wt % Mo and 0.5 wt % $Cr_3C_2$ (EFP006) having an eta-phase. FIG. 3 is an electron microscope image of this sample.

Table 4 shows examples from interrupted cutting in stainless steel with the material Mo+Cr+WC+Co alloy (named EFP006) and the reference without Mo addition (H10F reference (89.5% WC008, 0.5% $Cr_3C_2$, 10% Co)). The number of cuts until edge chipping occurred on uncoated samples.

TABLE 4

| Edge No | HF | H10F reference | EFP006 |
|---|---|---|---|
| 1 | 2 cuts | 5 cuts | 7 cuts |
| 2 | 2 | 4 | 6 |
| 3 | 4 | 2 | 10 |
| Mean | 2.7 cuts | 3.7 cuts | 7.7 cuts |

Example 3

Experimentation was performed on variants with different cobalt contents. The Mo additions were scaled with the cobalt content in the range of 5-15% of the cobalt content.

The materials were made in 100 g lots by lab milling the powders and PEG in ethanol/water for 8 hours. Molybdenum was added in the form of $Mo_2C$. The materials where sintered at 1410° C. by sinter/HIP at 50 bar, then the samples were polished and then HV30 and K1c properties measured. The recipes used and measurements of hardness and toughness are shown in table 5.

TABLE 5

| | H6f-1Mo | H6F-baseline | H6f-hMo | H10F-1Mo | H10F-baseline | H10F-hMo | H15f-1Mo | H15F-baseline | H15F-hMo |
|---|---|---|---|---|---|---|---|---|---|
| WC (wt %) | 93.4 | 93.7 | 92.8 | 89 | 89.5 | 88 | 83.5 | 84.25 | 82 |
| Co (wt %) | 6 | 6 | 6 | 10 | 10 | 10 | 15 | 15 | 15 |
| Mo (wt %) | 0.3 | 0 | 0.9 | 0.5 | 0 | 1.5 | 0.75 | 0 | 2.25 |
| $Cr_3C_2$ (wt %) | 0.3 | 0.3 | 0.3 | 0.5 | 0.5 | 0.5 | 0.75 | 0.75 | 0.75 |
| Mo/Co | 0.05 | 0 | 0.15 | 0.05 | 0 | 0.15 | 0.05 | 0 | 0.15 |
| HV30 | 1830 | 1790 | 1840 | 1580 | 1595 | 1660 | 1400 | 1380 | 1410 |
| $K_{1C}$ (shetty) | 9.4 | 9.5 | 9.3 | 11.0 | 11.0 | 10.8 | 13.2 | 15.1 | 12.7 |

It can be seen that in all cases the additions of the Mo both at the 0.05 and 0.15 Mo/Co ratio has resulted in hardness, with a slight reduction in toughness, compared to the baseline. As a similar response in material properties has been observed as for the 10% binder examples similar changes in performance can be expected from these materials.

It is also known that Co can dissolve Mo during sintering, but after cooling retained Mo might lead to reduced binder ductility and lower fracture toughness. Therefore inclusion of Mo (and probably Cr also) in carbide grade compositions should be regarded essentially as adding to the hard phase rather than providing an extra constituent to the ductile binder. Co is the key provider of ductility to hard metals, grade toughness being determined by Co volume fraction in relation to all other ingredients.

It should be appreciated that a variety of combinations of Co and Mo within the disclosed ranges, as well as other ranges, is contemplated and that the application should not be limited to just those combinations disclosed.

The effect upon grade toughness of partially replacing Co with Mo (up to ~2 vol %) in Co—$Cr_3C_2$-sub-micron WC hard metal has been studied. Results of these studies show that hardness increased moderately and K1c decreased slightly with increasing replacement of Co by Mo.

Average edge toughness, as represented by number of interrupted facing cuts on austenitic stainless steel tube, decreased with increasing replacement of Co by Mo. This agreed with K1c the trend. Spread in individual cutting life results was rather wide, implying that extrinsic factors could have had some influence.

Cobalt is the key provider of ductility in hard metal. Volume fractions of other ingredients, such as those grain growth inhibitors with high solubility in Co should not be regarded as equivalent to Co in providing ductility to the grade.

Although the present embodiment(s) has been described in relation to particular aspects thereof, many other variations and modifications and other uses will become apparent to those skilled in the art. It is preferred therefore, that the present embodiment(s) be limited not by the specific disclosure herein, but only by the appended claims.

What is claimed is:

1. A hard metal composition of material, consisting of:
   cobalt in an amount of from 6-15 wt %;
   molybdenum in an amount of from 5-15% of the cobalt content;
   chromium carbide in an amount of from 5-15% of the cobalt content; and
   a balance of tungsten carbide.

2. The hard metal composition according to claim 1, wherein the molybdenum content is 15% and the chromium carbide content is 15% of the cobalt content.

3. The hard metal composition according to claim 1, wherein the material has a grain size of less than 1 μm.

4. The hard metal composition according to claim 1, wherein the material has a hardness of 1570 HV30 to 1710 HV30 and a toughness of 9.8 K1c (Shetty) to 11.0 K1c (Shetty).

5. A cutting tool comprising a hard metal composition of material, the material consisting of:
   cobalt in an amount of from 6-15 wt %;
   molybdenum in an amount of from 5-15% of the cobalt content;
   chromium carbide in an amount of from 5-15% of the cobalt content; and
   a balance of tungsten carbide.

* * * * *